2,887,516

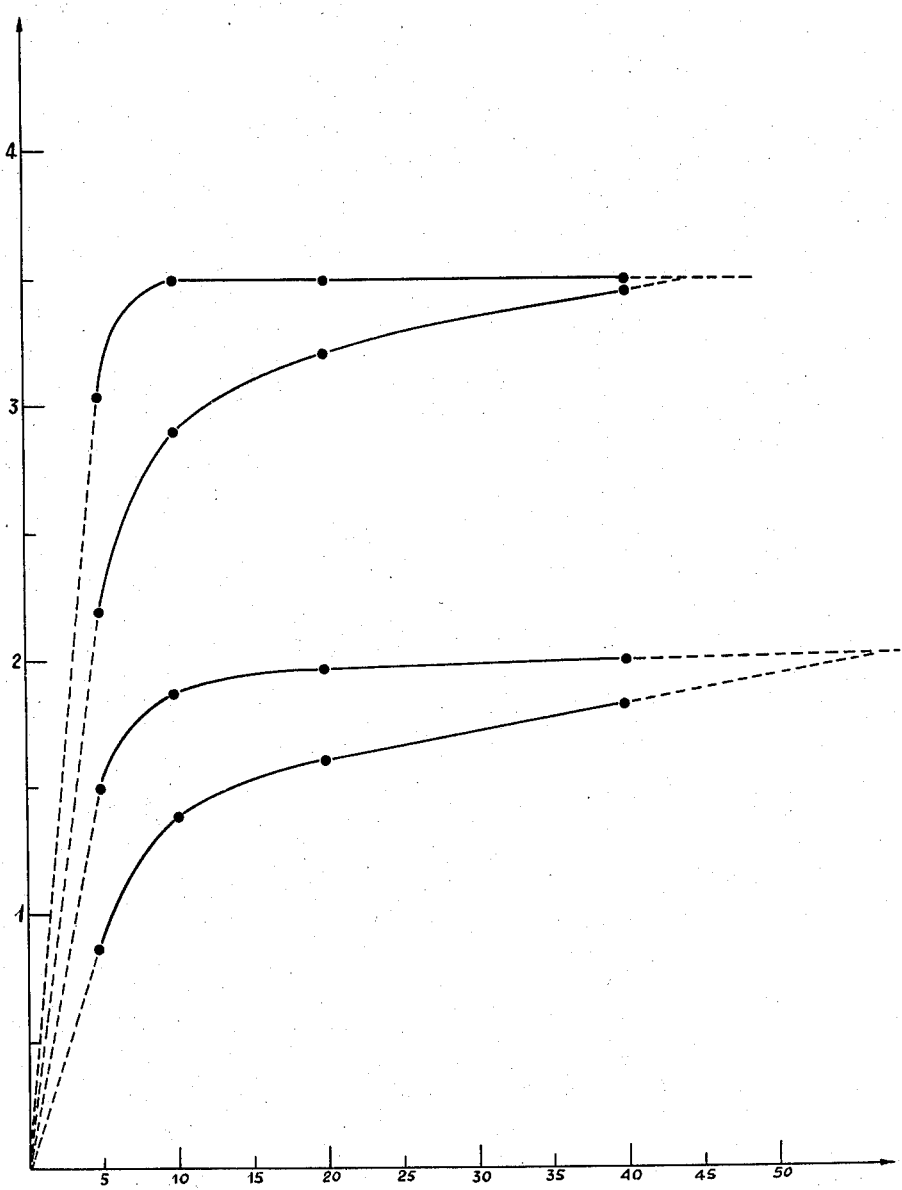

STABILIZATION OF THE TRICHLOROETHYLENE AND STABILIZING PRODUCT THEREFOR

Antonio Ferri and Germano Patron, Milan, Italy, assignors to Sicedison S.p.A., Milan, Italy Application December 21, 1956, Serial No. 629,992

Claims priority, application Italy November 23, 1956

6 Claims. (Cl. 260—652.5)

The present invention pertains to a method for preventing or inhibiting the decomposition of the trichloroethylene, as it occurs especially in the degreasing processes for metals.

It is well known that the trichloroethylene is a very unstable compound; the more or less associated effect of the humidity, the air, the light and the heating causes decomposition phenomena and hence formation of hydrochloric acid, phosgene, carbon oxide, dichloroacetylchloride. Due to the presence of metallic surfaces as iron and aluminium these phenomena may increase considerably and they are autocatalytic. On the other hand the hydrochloric acid chemically attacks the metals by forming the relative chlorides, which come into contact with the trichloroethylene as for instance in the degreasing processes; such chlorides, particularly the aluminium and iron chlorides cause in turn an increasing of the above mentioned decomposition processes as well as a more or less intense coloration due to the polymerisation condensation products.

The present invention is based on the observation that a mixture consisting of an epoxidic compound (as propylene oxide, butylene oxide and its isomers) and of ethyl acetate prevents or inhibits with kinetic speed the decomposition of the trichloroethylene when the latter comes into contact with iron, aluminium and their chlorides, which, as it is well known, may be formed by the effect of the decomposition products of the trichloroethylene itself.

This stabilizing effect is based on the fact that the reaction of the alkylenic oxide with the decomposition products of the trichloroethylene, which tends to stop the autocatalysis of the decomposition reaction, is for the following concentrations, considerably accelerated by the presence of ethyl-acetate.

EXAMPLE 1

We consider 250 cc. of trichloroethylene, to which are added 0.3% by weight of butylene oxide and 0.15% by weight of anhydrous aluminium chloride in the presence of 0.07% by weight of ethyl-acetate.

Similarly the same quantities of trichloroethylene, of butylene-oxide and anhydrous aluminium chloride are considered, without adding any ethyl acetate. The reactions are performed at 105°±0.1° C. in containers provided with a rain refrigerator. The rates of reaction are followed by means of a Perkin-Elmer mod. 21, infrared spectro photometer, and are expressed as a function of the height of the two absorption bands of the reaction product respectively at 2.8 to 9.5 micron.

In Fig. 1 the reaction kinetics between the butylene oxide and the aluminium chloride (which are added to the trichloroethylene respectively in the proportions of 0.3% and 0.15%) are shown as a function of the presence or absence of 0.07% of ethyl acetate.

The considerable effect of the ethyl acetate appears obvious from the shape of the two curves.

Successive investigations have emphasized that the trichloroethylene reaches an even greater stability, if some isobutyl alcohol associated with the above mentioned stabilizing products is added to said trichloroethylene.

The effect of the isobutyl alcohol is to cooperate in stopping the autocatalysis of the decomposition reaction of the trichloroethylene by reacting with one of the reaction products and namely with the phosgene.

In the table following the second example are shown the results obtained by the comparative stability tests, which tend to demonstrate even better and more completely the stabilizing effect of the association of alkylenic oxide+ethyl acetate+isobutyl alcohol.

EXAMPLE 2

We consider four quantities of 250 cc. of trichloroethylene to which, in order to obtain the desired stabilization, we add respectively:

Test A: 0.01% pyridine
Test B: 0.01% pyridine+0.3 butylene oxide
Test C: 0.01% pyridine+0.3 butylene oxide+0.2% ethyl acetate
Test D: 0.01% pyridine+0.3 butylene oxide+0.2% ethyl acetate+0.1% isobutyl alcohol.

The tests were performed at the boiling point for three hours in 500 cc. containers provided with a rain refrigerator. An aluminium plate 15 x 60 x 1 mm. was dipped half in the vapor phase and half in the liquid phase of the trichloroethylene.

0.15% of anhydrous aluminium chloride was added to the trichloroethylene itself. The acidity of the previously cooled and then paper filtered trichloroethylene was determined at the end of the test. The examination of the results presented in the following table emphasizes the technical progress obtained by means of the present invention.

*Table I*

| Trichloroethylene type | Acidity of the trichloroethylene after the stability test. cc. of HCl N/100 for 100 cc. of trichloroethylene. |
|---|---|
| "A" 0.01% pyridine | 177 |
| "B" 0.01% pyridine 0.3% butylene oxide | 8.6 |
| "C" 0.01% pyridine 0.3% butylene oxide 0.2% ethyl acetate | 4.1 |
| "D" 0.01% pyridine 0.3% butylene oxide 0.2% ethyl acetate 0.1% isobutyl alcohol | 0.7 |

What we claim is:

1. Stabilizing composition as an adjuvant for trichloroethylene consisting in a synergistic mixture of, in parts by weight, about 1 part of pyridine, 30 parts of butylene oxide, 20 parts of ethyl acetate and 10 parts of isobutyl alcohol.

2. A stable trichloroethylene containing, in an amount of up to about 3% by weight of the amount of trichloroethylene, a synergistic mixture consisting, in parts by weight, of about 1 part of pyridine, from 0.1 to 100 parts of butylene oxide, from 0.1 to 100 parts of ethyl acetate and from 0.1 to 100 parts of isobutyl alcohol.

3. A method for stabilizing trichloroethylene, consisting in adding to a trichloroethylene to be stabilized a mixture composed of pyridine added in an amount of 0.001% to 0.1%, butylene oxide added in an amount of 0.01 to 1%, ethyl acetate added in an amount of 0.01 to 1%, and isobutyl alcohol added in an amount of 0.01% to 1%, all percentages being by weight of the stabilized trichloroethylene.

4. A method as claimed in claim 3, wherein said mixture is added to the trichloroethylene to be stabilized in amounts up to about 3% by weight of the stabilized trichloroethylene.

5. A stabilizing product for the stabilization of trichloroethylene consisting of a synergistic mixture consisting of from 1 to 100 parts of pyridine, from 10 to 1000 parts of butylene oxide, from 10 to 1000 parts by weight of isobutyl alcohol, and from 10 to 1000 parts by weight of ethyl acetate, all parts being by weight.

6. A stable trichloroethylene containing a synergistic mixture consisting in parts by weight, of about 1 part of pyridine, from 0.1 to 100 parts of butylene oxide, from 0.1 to 100 parts of ethyl acetate and from 0.1 to 100 parts of isobutyl alcohol.

References Cited in the file of this patent

UNITED STATES PATENTS

| | | |
|---|---|---|
| 2,371,644 | Petering et al. | Mar. 20, 1945 |
| 2,721,883 | Stevens | Oct. 25, 1955 |
| 2,797,250 | Copelin | June 25, 1957 |